US012401238B2

(12) United States Patent
Luo (10) Patent No.: US 12,401,238 B2
(45) Date of Patent: Aug. 26, 2025

(54) STATOR FOR MOTOR AND OIL COOLING MOTOR

(71) Applicant: XIAOMI EV TECHNOLOGY CO., LTD., Beijing (CN)

(72) Inventor: Wenhui Luo, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 471 days.

(21) Appl. No.: 17/895,634

(22) Filed: Aug. 25, 2022

(65) Prior Publication Data

US 2023/0369924 A1    Nov. 16, 2023

(30) Foreign Application Priority Data

May 10, 2022  (CN) .......................... 202210507529.7

(51) Int. Cl.
*H02K 1/20* (2006.01)
*H02K 9/19* (2006.01)

(52) U.S. Cl.
CPC ................. *H02K 1/20* (2013.01); *H02K 9/19* (2013.01)

(58) Field of Classification Search
CPC . H02K 1/20; H02K 5/203; H02K 9/19; Y02T 10/64
See application file for complete search history.

(56) References Cited

U.S. PATENT DOCUMENTS

| 2007/0024129 A1 | 2/2007 | Pfannschmidt et al. |
| 2017/0271955 A1 | 9/2017 | Hanumalagutti et al. |
| 2022/0045576 A1* | 2/2022 | Druant ..................... H02K 3/24 |
| 2023/0141526 A1* | 5/2023 | Alahyari ................. F16K 15/00 |
| 2023/0223801 A1* | 7/2023 | Druant ..................... H02K 1/20 310/54 |
| 2023/0283148 A1* | 9/2023 | Xu ........................... H02K 9/19 310/58 |
| 2024/0348127 A1* | 10/2024 | Gersten ................. H02K 16/00 |

(Continued)

FOREIGN PATENT DOCUMENTS

| CN | 108370180 A | 8/2018 |
| CN | 112615445 A | 4/2021 |

(Continued)

OTHER PUBLICATIONS

Chinese Patent Application No. 202210507529.7, Office Action dated Jul. 1, 2023, 9 pages.

(Continued)

*Primary Examiner* — Christopher M Koehler
*Assistant Examiner* — Ethan Nguyen Vo
(74) *Attorney, Agent, or Firm* — Cozen O'Connor (57) ABSTRACT

A stator for a motor includes a stator core of a hollow columnar structure. The stator core includes a first end and a second end in an axial direction. The stator core defines a first oil cooling channel and a second oil cooling channel through in the axial direction. The first oil cooling channel has a first oil inlet at the first end and a first oil outlet at the second end. The second oil cooling channel has a second oil outlet at the first end and a second oil inlet at the second end. At the first end, the first oil inlet and the second oil outlet are arranged along a circumferential direction of the stator core and located on a same circumference centered around an axis of the stator core.

19 Claims, 6 Drawing Sheets

(56) References Cited

U.S. PATENT DOCUMENTS

2024/0364152 A1* 10/2024 Sever .................... H02K 3/345
2024/0372420 A1* 11/2024 Christensen ............ H02K 9/04
2024/0388168 A1* 11/2024 Ledieu .................. H02K 15/02

FOREIGN PATENT DOCUMENTS

| CN | 113783323 A | 12/2021 |
| CN | 114421677 A | 4/2022 |

OTHER PUBLICATIONS

Chinese Patent Application No. 202210507529.7, English translation of Office Action dated Jul. 1, 2023, 14 pages.
European Patent Application No. 22192636.3, Office Action dated May 22, 2023, 10 pages.
Chinese Patent Application No. 202210507529.7, Office Action dated Mar. 25, 2023, 8 pages.
Chinese Patent Application No. 202210507529.7, English translation of Office Action dated Mar. 25, 2023, 8 pages.

* cited by examiner

STATOR FOR MOTOR AND OIL COOLING MOTOR

CROSS-REFERENCE TO RELATED APPLICATION

The present application claims benefit of priority to Chinese Patent Application No. 202210507529.7 filed on May 10, 2022, the entire contents of which are incorporated herein by reference for all purposes.

FIELD

The present disclosure relates to the field of motor cooling technologies, and in particular, to a stator for a motor and an oil cooling motor.

BACKGROUND

Taking a driving motor of a new energy vehicle as an example, the higher the speed, torque density, and power density of the motor, the higher the heat generated. Therefore, a heat dissipation/cooling structure of a motor is essential for reliable, stable, and efficient operation of the motor.

SUMMARY

Embodiments of the present disclosure provide a stator for a motor. The stator includes a stator core of a hollow columnar structure. The stator core includes a first end and a second end in an axial direction, the stator core defines a first oil cooling channel and a second oil cooling channel, and the first oil cooling channel and the second oil cooling channel are through in the axial direction. The first oil cooling channel has a first oil inlet at the first end and a first oil outlet at the second end, the second oil cooling channel has a second oil outlet at the first end and a second oil inlet at the second end, and at the first end, the first oil inlet and the second oil outlet are arranged along a circumferential direction of the stator core and located on a same circumference centered around an axis of the stator core.

Embodiments of the present disclosure further provides an oil cooling motor. The oil cooling motor includes a housing and a stator. The housing defines a housing oil inlet. The stator includes a stator core of a hollow columnar structure. The stator core includes a first end and a second end in an axial direction. The stator core defines a first oil cooling channel and a second oil cooling channel, and the first oil cooling channel and the second oil cooling channel are through in the axial direction. The first oil cooling channel has a first oil inlet at the first end and a first oil outlet at the second end, the second oil cooling channel has a second oil outlet at the first end and a second oil inlet at the second end, and at the first end, the first oil inlet and the second oil outlet are arranged along a circumferential direction of the stator core and located on a same circumference centered around an axis of the stator core. The stator is arranged in the housing, and the first oil inlet and the second oil inlet of the stator core are communicated with the housing oil inlet.

DETAILED DESCRIPTION

Example embodiments will be described in detail herein, and examples thereof are illustrated in the drawings. When the following description relates to the drawings, the same numbers in different drawings denote same or similar elements unless otherwise indicated. Implementations described in the following example embodiments do not represent all implementations consistent with the present disclosure. Rather, they are merely examples of apparatuses and methods that are consistent with some aspects of the present disclosure.

The terms used in the present disclosure are intended solely to describe particular embodiments and are not intended to limit the present disclosure. Unless defined otherwise, technical and scientific terms used in the present disclosure have the same meaning as is commonly understood by those of ordinary skill in the art to which the present disclosure belongs. "First", "second", and similar terms as used in the present disclosure do not denote any order, quantity, or importance, but rather are used to distinguish one component from another. Also, "one", "a/an" and similar terms do not denote a limitation on quantity, but rather denote the presence of at least one of the referenced items, and may be specified separately when referring only to "one". "A plurality of" or "several" means two or more. Unless otherwise noted, "front," "back", "lower," and/or "upper", "top", "bottom" and other similar terms are only for the convenience of description, and are not intended to be limited to a particular position or space orientation. "Comprise", "include" and similar terms mean that an element or item before "comprise" or "include" covers elements or items listed after "comprise" or "include" and equivalents thereof, and do not exclude other elements or items. "Connect", "join" and similar terms are not limited to physical or mechanical connections, and may include electrical connections, whether direct or indirect.

Motor cooling may be divided into air cooling, water cooling, and oil cooling. Oil cooling is becoming the first choice of a high-performance motor cooling scheme by virtue of advantages of natural electrical insulation and high degree of freedom in structural design.

The driving motor of the new energy vehicle is mostly a permanent magnet synchronous motor. When the motor operates at a middle and low speed range, a stator part of the motor generates high heat. The majority of the heat is generated by a stator winding and a stator core. When the motor operates at a high speed range, heat generated by a rotor part of the motor increases dramatically. Therefore, if the stator part or rotor part of the driving motor cannot be effectively dissipated and cooled, overall performance of the motor may be directly affected, resulting in low reliability, stability, and efficiency of the operation of the motor, and seriously affecting the reliable and stable operation of the vehicle.

Figure 1:
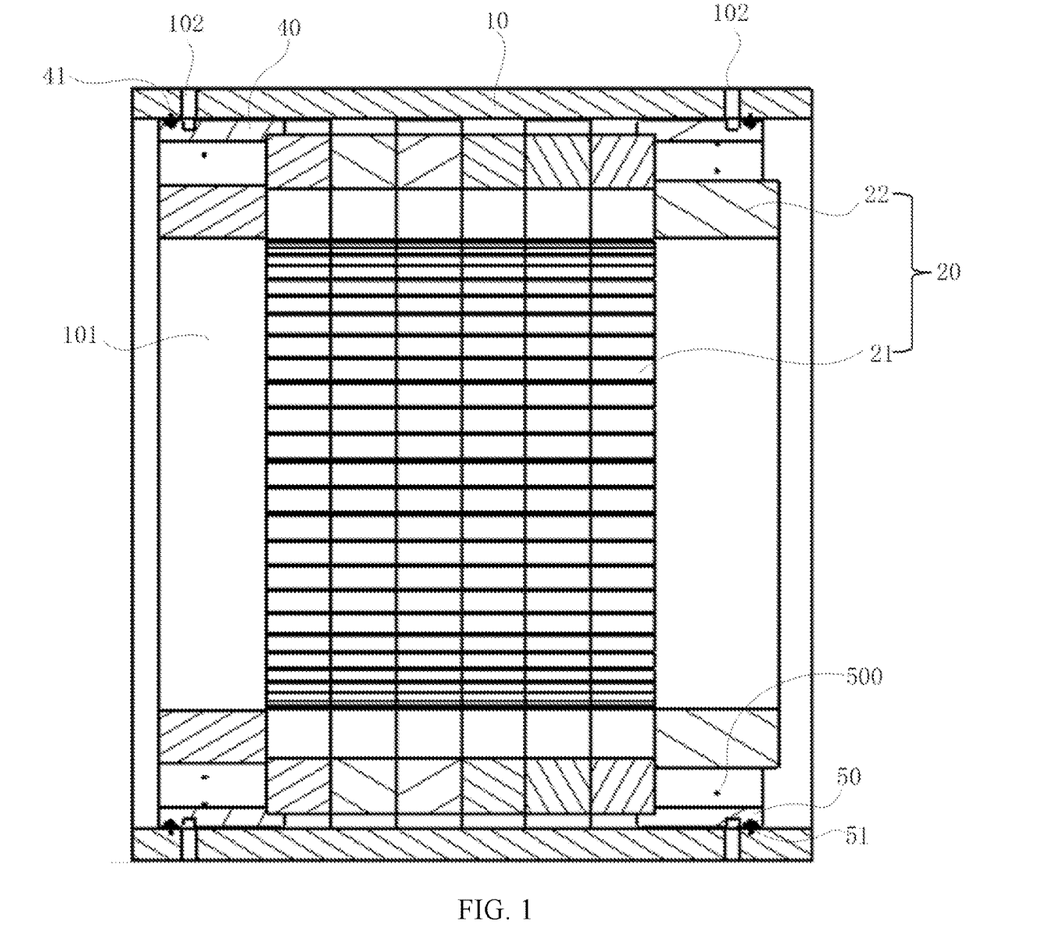
FIG. 1 is a sectional view of a partial structure of an oil cooling motor according to an example of the present disclosure.

Referring to FIG. 1, FIG. 1 is a schematic diagram of a partial structure of an oil cooling motor 1 according to an example of the present disclosure.

The oil cooling motor 1 according to the embodiment of the present disclosure includes a housing 10, a stator 20, and a rotor (not illustrated). A receiving chamber 101 is formed inside the housing 10, the stator 20 and the rotor are both received in the receiving chamber 101, and the stator 20 is coaxial with the rotor. The stator 20 remains relatively fixed to the housing 10, the rotor is rotatable with respect to the stator 20, and the stator 20 is arranged around the outside of the rotor. The housing 10 further defines a housing oil inlet 102. Cooling oil may be transported into the stator core 21 through the housing oil inlet 102.

The stator 20 includes a stator core 21 and a stator winding 22 assembled on the stator core 21. The stator core 21 has a hollow columnar structure, and the rotor is assembled at a hollow part of the stator core 21. The oil cooling motor 1 may cool the stator core 21 and the stator winding 22 by oil.

Figure 2:
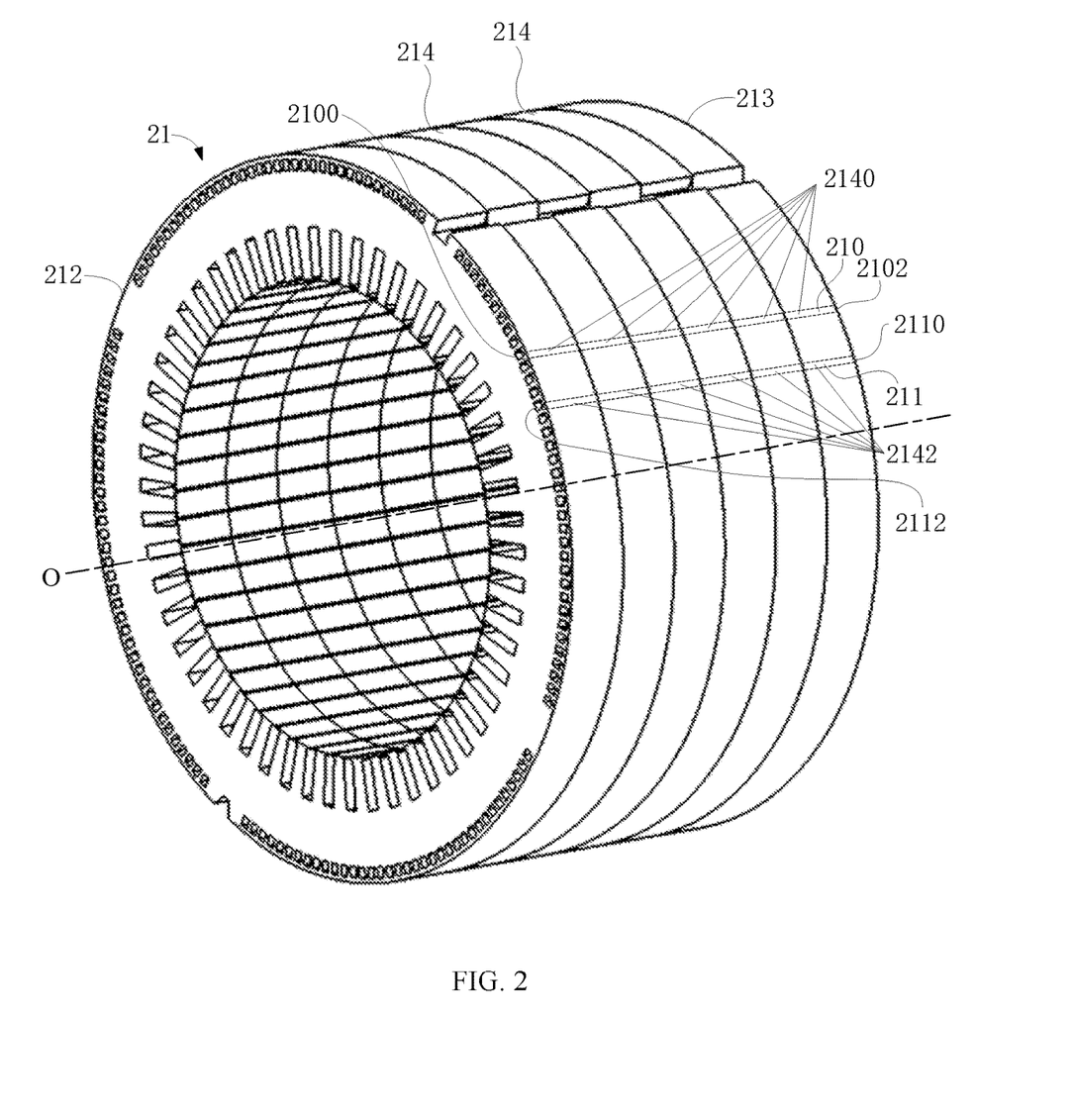
FIG. 2 is a schematic diagram of a stator core according to an example of the present disclosure.

Referring to FIG. 2, FIG. 2 is a schematic diagram of the stator core 21 according to an example of the present disclosure.

The stator core 21 has a hollow cylindrical structure and has an axis O. An axial direction of the stator core 21 refers to an extension direction of the axis O, and a circumferential direction of the stator core 21 refers to a circumferential direction around the axis O.

The stator core 21 includes a first oil cooling channel 210, a second oil cooling channel 211, and a first end 212 and a second end 213 in the axial direction. The first oil cooling channel 210 passes through the first end 212 and the second end 213, and defines a first oil inlet 2100 at the first end 212 and a first oil outlet 2102 at the second end 213. The first oil inlet 2100 allows oil to flow in. The first oil outlet 2102 allows oil to flow out. The second oil cooling channel 211 passes through the first end 212 and the second end 213, and defines a second oil inlet 2110 at the second end 213 and a second oil outlet 2112 at the first end 212. The second oil inlet 2110 allows oil to flow in. The second oil outlet 2112 allows oil to flow out. With the arrangement, cooling oil can be transported respectively from two axial ends of the stator core 21 to the stator core 21 through the first oil cooling channel 210 and the second oil cooling channel 211, and the stator core 21 can be cooled through multiple oil channels in opposite circulation directions, which improves heat dissipation efficiency and achieves uniform heat dissipation.

The present disclosure further proposes that, at the first end 212, the first oil inlet 2100 and the second oil outlet 2112 are arranged along the circumferential direction of the stator core 21 and located on the same circumference centered around the axis of the stator core 21. The first oil inlet 2100 and the second oil outlet 2112 are circumferentially distributed, so that the stator core 21 can be cooled at different parts in the circumferential direction. Moreover, this arrangement also enables the first oil inlet 2100 and the second oil outlet 2112 to be more compact in a radial direction of the stator core 21, which is conducive to reducing a radial size of the stator core 21 at the first end 212.

Similarly, at the second end 213, the first oil outlet 2102 and the second oil inlet 2110 may be arranged along the circumferential direction of the stator core 21 and located on the same circumference centered around the axis of the stator core 21. In this way, it is conducive to reducing a radial size of the stator core 21 at the second end 213.

In an embodiment, the stator core 21 defines a plurality of first oil cooling channels 210 extending in parallel. Correspondingly, the plurality of first oil cooling channels 210 form a plurality of first oil inlets 2100 at the first end 212, and form a plurality of first oil outlets 2102 at the second end 213. The plurality of first oil inlets 2100 are communicated with the plurality of first oil outlets 2102 in a one-to-one correspondence manner. In this way, a cooling area of the stator core 21 can be increased, a cooling effect can be further improved, and heat dissipation uniformity of the stator 20 can be further improved.

The stator core 21 may further define a plurality of second oil cooling channels 211 extending in parallel. The plurality of second oil cooling channels 211 form a plurality of second oil inlets 2110 at the second end 213, and form a plurality of second oil outlets 2112 at the first end 212. The plurality of second oil inlets 2110 are communicated with the plurality of second oil outlets 2112 in a one-to-one correspondence manner.

In an embodiment, at the first end 212, the plurality of first oil inlets 2100 are arranged along the circumferential direction, the plurality of second oil outlets 2112 are arranged along the circumferential direction, and the plurality of first oil inlets 2100 and the plurality of second oil outlets 2112 are interleaved. "Interleaved" herein means that the plurality of first oil inlets 2100 and the plurality of second oil outlets 2112 are arranged in a mixed manner in the circumferential direction. In this way, the plurality of first oil inlets 2100 and the plurality of second oil outlets 2112 can be separated from each other to prevent excessive concentration of the plurality of first oil inlets 2100 and excessive concentration of the plurality of second oil outlets 2112. For example, as one implementation of interleaving, one or more second oil outlets 2112 are arranged between two adjacent first oil inlets 2100; or one or more first oil inlets 2100 are arranged between two adjacent second oil outlets 2112. As another implementation of interleaving, the first oil inlets 2100 and the second oil outlets 2112 are arranged alternately. The interleaving has an advantage that circumferential parts of the stator core 21 can be cooled evenly and a temperature difference between different parts of the stator core 21 can be reduced. Specifically, during the flow of the cooling oil, the cooling oil and the stator core 21 may exchange heat constantly. At the first oil inlet 2100, the cooling oil is at a relatively low temperature, and has a good heat exchange effect with the stator core 21. At the second oil outlet 2112, the cooling oil is at a relatively high temperature, and has a poor heat exchange effect with the stator core 21. Through the interleaving of the first oil inlets 2100 and the second oil outlets 2112, the temperature difference between the circumferential parts of the stator core 21 at the first end 212 can be reduced, so that the stator core 21 can dissipate heat evenly at the first end 212.

In an embodiment, at the second end 213, the plurality of second oil inlets 2110 are arranged along the circumferential direction, the plurality of first oil outlets 2102 are arranged along the circumferential direction, and the plurality of second oil inlets 2110 and the plurality of first oil outlets 2102 are interleaved. In this way, a temperature difference between circumferential parts at the second end 213 is relatively small, so that the stator core 21 can dissipate heat evenly at the second end 213.

In an embodiment, a plurality of first oil cooling channels 210 and a plurality of second oil cooling channels 211 may be distributed along the whole circumference of the stator core 21 along the circumferential direction of the stator core 21. Correspondingly, the plurality of first oil inlets 2100 and the plurality of second oil outlets 2112 formed at the first end 212 and the plurality of second oil inlets 2110 and the plurality of first oil outlets 2102 formed at the second end 213 are all distributed along the whole circumference of the stator core along the circumferential direction. In this way, the stator core 21 can achieve 360° heat dissipation in the circumferential direction. The plurality of first oil inlets 2100 and the plurality of second oil outlets 2112 are located on a same circumference centered around an axis of the stator core 21, and the plurality of second oil inlets 2110 and the plurality of first oil outlets 2102 are located on the same circumference centered around the axis of the stator core 21.

In the embodiment illustrated in FIG. 2, the first oil inlet 2100 and the first oil outlet 2102 of the first oil cooling channel 210 are oppositely arranged along the axial direction of the stator core 21. In this way, the first oil cooling channel 210 can be formed as a straight-through oil cooling channel, so that cooling parts of the stator core 21 can be relatively concentrated in the circumferential direction.

In the embodiment illustrated in FIG. 2, the second oil inlet 2110 and the second oil outlet 2112 of the second oil cooling channel 211 are oppositely arranged along the axial direction of the stator core 21. In this way, the second oil cooling channel 211 can be formed as a straight-through oil cooling channel, so that cooling parts of the stator core 21 can be relatively concentrated in the circumferential direction.

Figure 3:
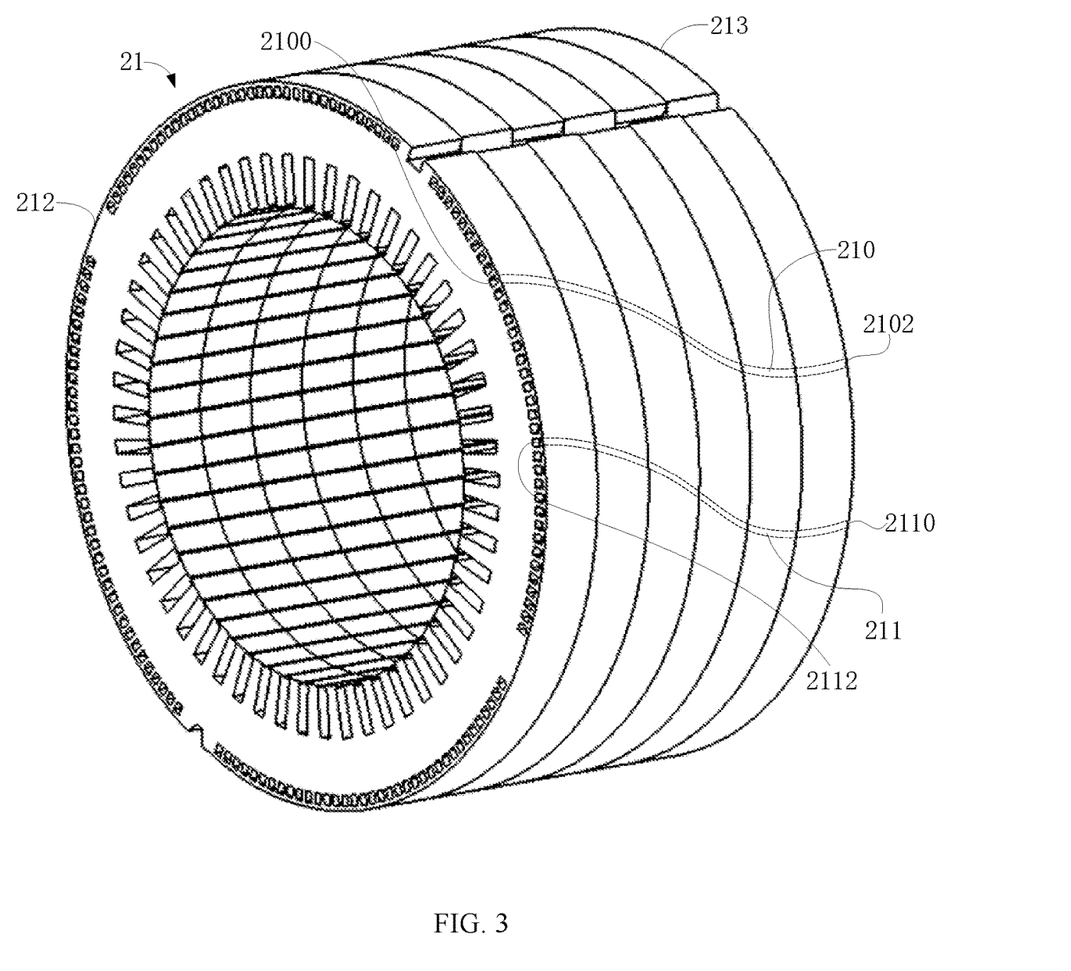
FIG. 3 is a schematic diagram of a first oil cooling channel and a second oil cooling channel of a stator core according to an example of the present disclosure.

Referring to FIG. 3, FIG. 3 is a schematic diagram of another embodiment of the first oil cooling channel 210 and the second oil cooling channel 211 in the stator core 21.

In the embodiment illustrated in FIG. 3, the first oil inlet 2100 and the first oil outlet 2102 of the first oil cooling channel 210 are staggered along the circumferential direction of the stator core 21. In this way, the first oil cooling channel 210 can be formed as a spiral oil cooling channel, so that cooling parts of the stator core 21 can be relatively dispersed in the circumferential direction.

In the embodiment illustrated in FIG. 3, the second oil inlet 2110 and the second oil outlet 2112 of the second oil cooling channel 211 are staggered along the circumferential direction of the stator core 21. In this way, the second oil cooling channel 211 can be formed as a spiral oil cooling channel, so that cooling parts of the stator core 21 can be relatively dispersed in the circumferential direction.

Shapes and sizes of the first oil inlet 2100 and the first oil outlet 2102 are not limited in the present disclosure. In this embodiment, the first oil inlet 2100 and the first oil outlet 2102 are both configured as square ports, and an opening area of the first oil inlet 2100 is equal to an opening area of the first oil outlet 2102. In other embodiments, the first oil inlet 2100 and the first oil outlet 2102 may be both configured as circular ports, and a diameter of the first oil inlet 2100 may be equal or unequal to a diameter of the first oil outlet 2102.

Still referring to FIG. 2, the stator core 21 includes a plurality of lamination stacks 214 stacked along the axial direction. Each of the lamination stacks 214 is formed by a plurality of laminations stacked along a thickness direction. The plurality of laminations may be reliably coupled by welding, riveting or bonding. The number of the laminations in each lamination stack 214 is not limited, which may be selected and set according to an actual requirement. The laminations in the same lamination stack 214 may be identical laminations.

Each of the lamination stacks 214 defines a first oil through hole 2140 and a second oil through hole 2142 through in the axial direction. The first oil through holes 2140 are sequentially communicated to form the first oil cooling channel 210. The second oil through holes 2142 are sequentially communicated to form the second oil cooling channel 211. In an embodiment, the first oil through hole 2140 in each lamination stack 214 has a straight-through structure, and the first oil through holes 2140 of the plurality of lamination stacks 214 are straight-through to form the first oil cooling channel 210 of the straight-through structure. Similarly, the second oil through hole 2142 in each lamination stack 214 has a straight-through structure, and the second oil through holes 2142 of the plurality of lamination stacks 214 are straight-through to form the second oil cooling channel 211 of the straight-through structure, which is not limited thereto.

Figure 4:
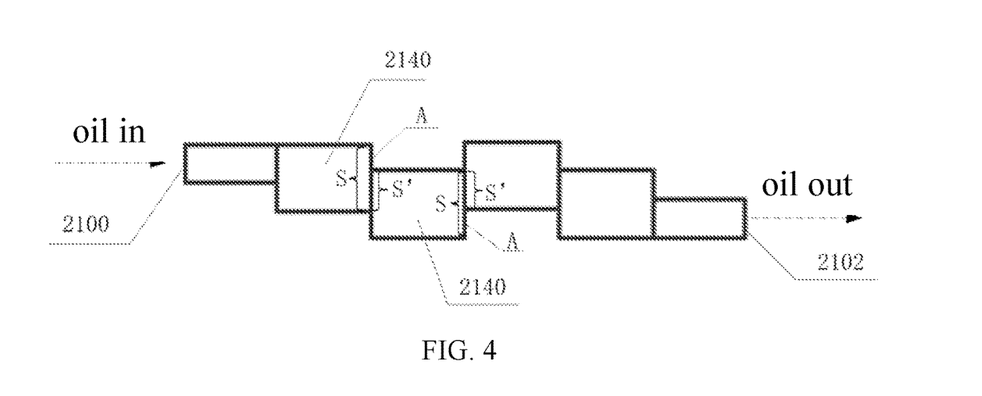
FIG. 4 is a schematic diagram of communication between first oil through holes of lamination stacks of a stator core.

Referring to FIG. 4, FIG. 4 is a schematic diagram of communication between the first oil through holes 2140 of the lamination stacks 214.

In this embodiment, an area where two first oil through holes 2140 of two adjacent lamination stacks 214 are communicated may be changed, so as to increase an area of contact between the oil in the first oil cooling channel 210 and the lamination stacks 214. Specifically, in at least two adjacent lamination stacks 214, a circulation area S of the first oil through hole 2140 of the lamination stack 214 closer to the first oil inlet 2100 is greater than a communication area S' where the two first oil through holes 2140 of the adjacent lamination stacks 214 are communicated. In some embodiments, in at least one pair of adjacent lamination stacks 214, a circulation area S of the first oil through hole 2140 of the lamination stack 214 closer to the first oil inlet 2100 is greater than a communication area S' where the two first oil through holes 2140 of the at least one of adjacent lamination stacks 214 are communicated. After the arrangement, when the oil flows from the first oil through hole 2140 of the left lamination stack 214 to the first oil through hole 2140 of the right lamination stack 214, due to a decrease in the communication area S', the oil is subject to resistance during the circulation and may contact a peripheral part A of the first oil through hole 2140 of the right lamination stack 214, which can increase an area of contact between the oil and the right lamination stack 214 and improve a heat exchange effect. In the embodiment illustrated in FIG. 4, the communication area S' where two adjacent first oil through holes 2140 are communicated is less than the circulation area of the first oil through hole 2140, so that areas of contact between the oil and the plurality of lamination stacks 214 can be increased.

The manner of decreasing the communication area S' is not limited. In an embodiment, the circulation area of the first oil through hole 2140 of the left lamination stack 214 may be greater than the circulation area of the first oil through hole 2140 of the right lamination stack 214.

In some other embodiments, the circulation areas of the first oil through holes 2140 of two adjacent lamination stacks 214 are equal, and two adjacent first oil through holes 2140 are partially staggered and partially communicated along the circumferential direction of the stator core 21. In this way, two adjacent first oil through holes 2140 can be circumferentially offset. When the cooling oil flows from the first oil through hole 2140 of the left lamination stack 214 into the first oil through hole 2140 of the right lamination stack 214, a region of the right lamination stack 214 outside the first oil through hole 2140 may contact the cooling oil, increasing the area of contact between the right lamination stack 214 and the cooling oil, and enhancing the cooling effect. Moreover, in this embodiment, the lamination stack 214 may be stacked by identical laminations, which can reduce types of dies for stamping laminations and help reduce manufacturing costs of the laminations.

In an embodiment, in order to increase an area of contact between the cooling oil in the second oil cooling channel 211 and the lamination stack 214, the same implementation manner as the above may be adopted. Specifically, in at least two adjacent lamination stacks 214 of the plurality of lamination stacks 214, a circulation area of the second oil through hole 2142 of the lamination stack 214 closer to the second oil inlet 2110 is greater than a communication area where the two second oil through holes 2142 of the adjacent lamination stacks 214 are communicated. The setting of the circulation areas of the second oil through holes 2142 in the lamination stacks 214 and the alignment manner of the second oil through holes 2142 may refer to those of the first oil through holes 2140, which are not repeated herein.

Figure 5:
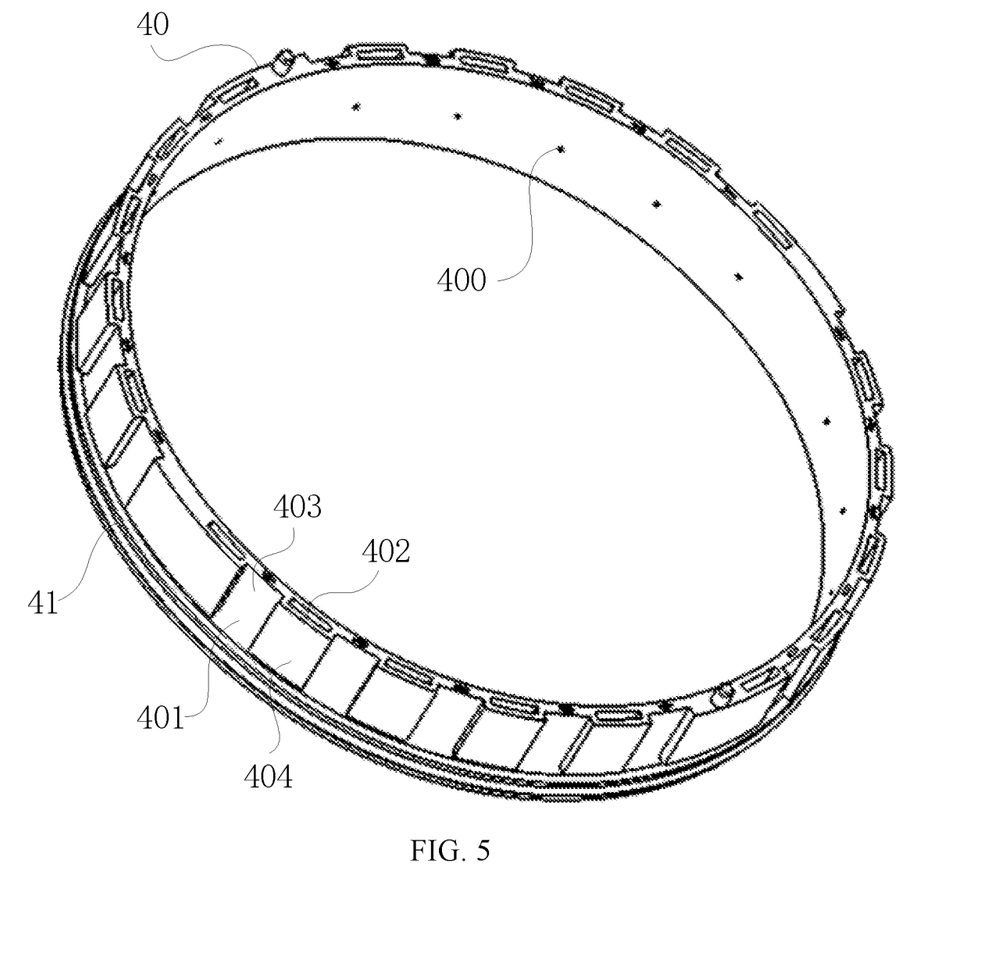
FIG. 5 is a schematic diagram of a first oil ring according to an example of the present disclosure.

Referring to FIG. 1 and FIG. 5, FIG. 5 is a schematic diagram of a first oil ring 40.

In an embodiment, the oil cooling motor 1 further includes a first oil ring 40. The first oil ring 40 is arranged at the first end 212 of the stator core 21. The first oil ring 40 is coaxial with the stator core 21. In an embodiment, a seal ring 41 fits over an end of the first oil ring 40 away from the stator core 21 along the axial direction. The seal ring 41 is clamped between the housing 10 and the first oil ring 40 along a radial direction of the first oil ring 40, for sealing a gap between the housing 10 and the first oil ring 40, which may also seal a channel between the housing oil inlet 102 and the first oil inlet 2100.

In an embodiment, the first oil ring 40 includes a first oil inlet chamber 401 communicated with the first oil inlet 2100 and a first oil outlet chamber 402 communicated with the second oil outlet 2112. The first oil inlet chamber 401 is further communicated with the housing oil inlet 102, so that the cooling oil can flow into the first oil inlet 2100 according to a preset path, and flow out of the second oil outlet 2112 to other parts of the stator 20 according to a preset path. In addition, with the arrangement of the first oil ring 40, oil pipes can be omitted, which is beneficial to simplify the structure of the stator 20 and improve the compactness of the stator 20. The first oil inlet chamber 401 and the first oil outlet chamber 402 are distributed on a same circumference centered around an axis of the first oil ring 40.

The specific structure of the first oil ring 40 is not limited in the present disclosure. In an embodiment, a first groove 403 and a first boss 404 circumferentially arranged and axially extending are formed on an outer surface of the first oil ring 40, and the first groove 403 forms the first oil inlet chamber 401. The first groove 403 extends axially, an end of the first groove 403 away from the stator core 21 is sealed by the seal ring 41 and is communicated with the housing oil inlet 102 in a sealing manner, and an end of the first groove 403 closer to the stator core 21 is communicated with the first oil inlet 2100. An end surface on a side of the first boss 404 facing the stator core 21 defines the first oil outlet chamber 402, and the first oil outlet chamber 402 extends axially in the first boss 404. In the solution, the first oil inlet chamber 401 is formed by defining the first groove 403, and the first oil outlet chamber 402 is formed by defining a chamber in the first boss 404. In this way, isolation between the first oil inlet chamber 401 and the first oil outlet chamber 402 is realized, and the formation of the first oil inlet chamber 401 and the first oil outlet chamber 402 is simple, which are easy to machine and manufacture.

In an embodiment where a plurality of first oil cooling channels 210 and a plurality of second oil cooling channels 211 are provided, the first oil ring 40 may define a plurality of first oil inlet chambers 401 and a plurality of first oil outlet chambers 402. The first oil inlet chambers 401 and the first oil outlet chambers 402 may be interleaved.

In an embodiment, a first oil injection hole 400 is formed on an inner surface of the first oil ring 40, the first oil injection hole 400 is communicated with the first oil outlet chamber 402, the stator 20 includes a stator winding 22, and the first oil injection hole 400 directly faces the stator winding 22. In this way, the cooling oil flowing out of the first oil outlet chamber 402 may further cool the stator winding 22, without a need to separately arrange an oil channel for cooling the stator winding 22.

Figure 6:
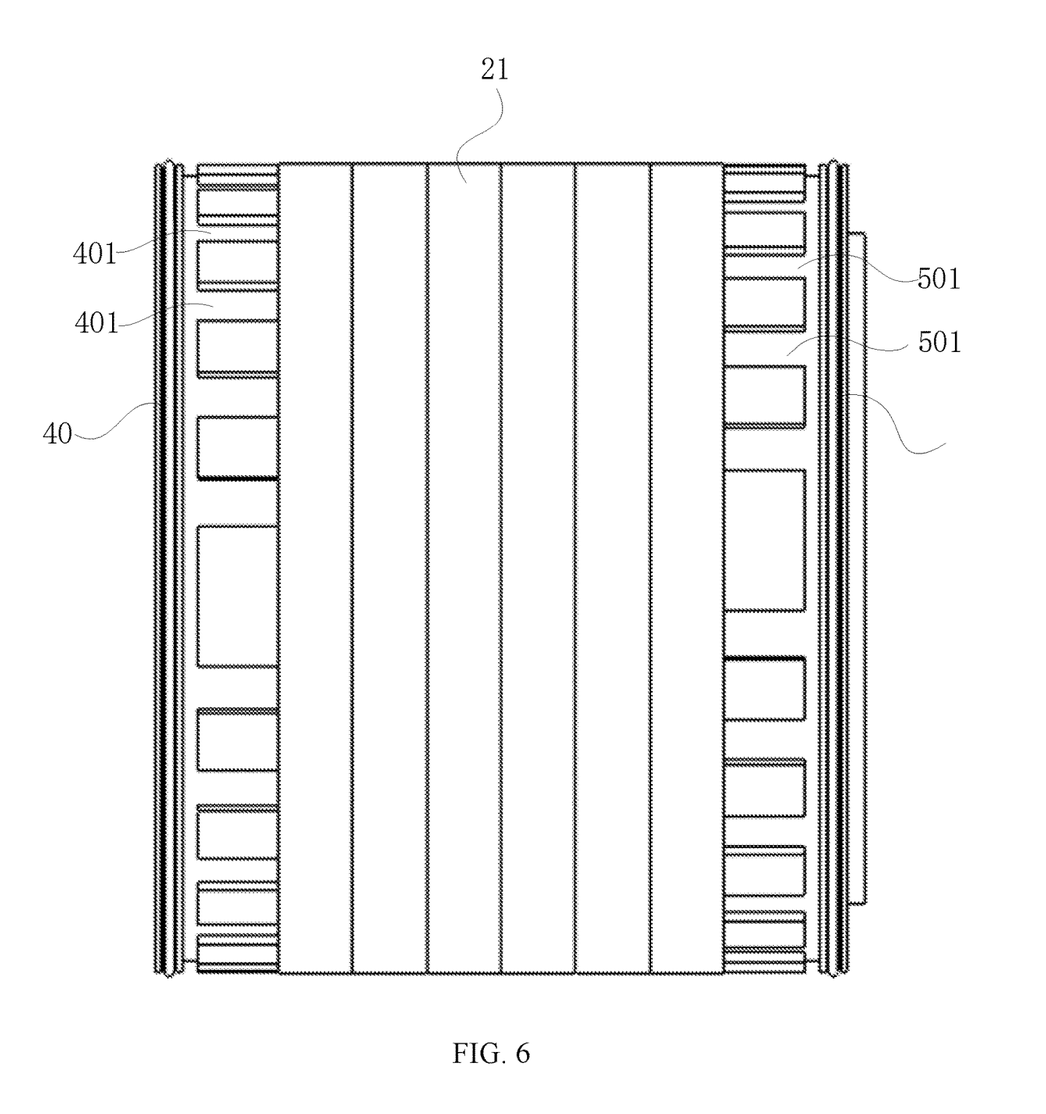
FIG. 6 is a schematic diagram of a first oil ring and a second oil ring assembled at two ends of the stator core.
Figure 7:
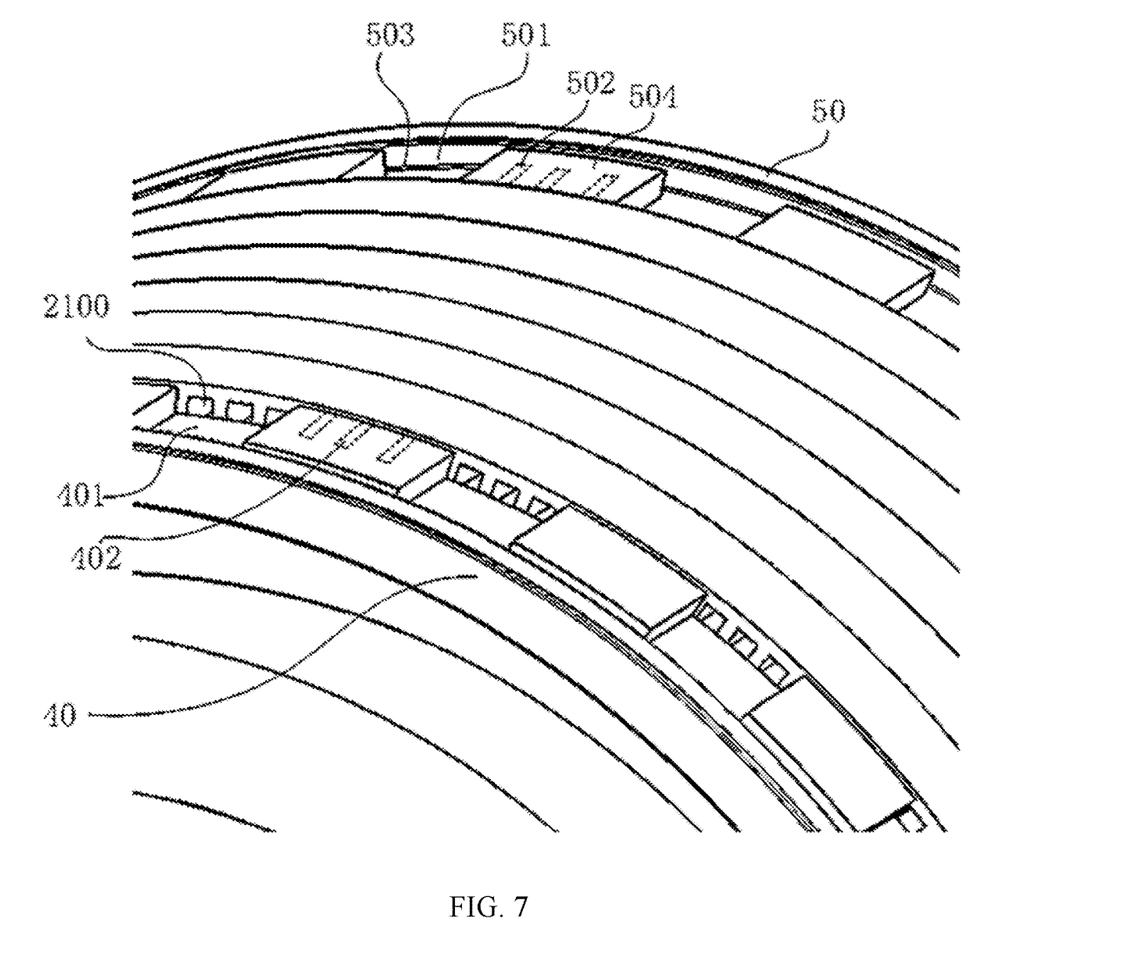
FIG. 7 is a schematic diagram of a partial structure illustrated in FIG. 6.

Referring to FIG. 6 and FIG. 7, FIG. 6 is a schematic diagram of a first oil ring 40 and a second oil ring 50 assembled at two ends of the stator core 21. FIG. 7 is a schematic diagram of a partial structure illustrated in FIG. 6.

As illustrated in FIG. 6, in an embodiment, a plurality of first oil inlet chambers 401 are communicated with each another at an end axially away from the stator core 21, and the plurality of first oil inlet chambers 401 are communicated with the housing oil inlet 102.

As illustrated in FIG. 7, a plurality of first oil inlets 2100 may be jointly communicated with one first oil inlet chamber 401, and a plurality of second oil outlets 2112 may be jointly communicated with one first oil outlet chamber 402, so that numbers of the first oil inlet chambers 401 and the first oil outlet chambers 402 can be reduced, and numbers of the first grooves 403 and the first bosses 404 can be reduced accordingly, which helps to simplify the structure of the first oil ring 40.

Referring to FIG. 1, FIG. 6, and FIG. 7, in an embodiment, the stator 20 further includes a second oil ring 50 arranged at the second end 213, the second oil ring 50 is coaxial with the stator core 21, and the second oil ring 50 includes a second oil inlet chamber 501 communicated with the second oil inlet 2110 and a second oil outlet chamber 502 communicated with the first oil outlet 2102.

A second seal ring 51 fits over an end of the second oil ring 50 away from the stator core 21. The second seal ring 51 is clamped between the housing 10 and the second oil ring 50 along a radial direction of the second oil ring 50, for sealing a gap between the housing 10 and the second oil ring 50. The second oil inlet chamber 501 is communicated with the housing oil inlet 102 and the second oil inlet 2110, and the second oil inlet chamber 501 and the housing oil inlet 102 are communicated in a sealing manner through the second seal ring 51. Two housing oil inlets 102 are provided and are spaced along the axial direction of the stator core 21. One of the housing oil inlets 102 is communicated with the first oil inlet 2100 through the first oil inlet chamber 401, and the other of the housing oil inlets 102 is communicated with the second oil inlet 2110 through the second oil inlet chamber 501, so that the oil is fed simultaneously from the two axial ends of the stator core 21.

In an embodiment where a plurality of first oil cooling channels 210 and a plurality of second oil cooling channels 211 are provided, the second oil ring 50 may define a plurality of second oil inlet chambers 501 and a plurality of second oil outlet chambers 502. The second oil inlet chambers 501 and the second oil outlet chambers 502 may be interleaved.

A plurality of second oil inlet chambers 501 are communicated with each other at an end axially away from the stator core 21, and the plurality of second oil inlet chambers 501 are communicated with the housing oil inlet 102.

In an embodiment, a second groove 503 and a second boss 504 circumferentially distributed and axially extending are formed on an outer surface of the second oil ring 50, the second groove 503 forms the second oil inlet chamber 501, an end surface on a side of the second boss 504 facing the stator core 21 defines the second oil outlet chamber 502, and the second oil outlet chamber 502 extends axially.

A plurality of second oil inlets 2110 may be jointly communicated with one second oil inlet chamber 501, and a plurality of first oil outlets 2102 may be jointly communicated with one second oil outlet chamber 502, so that numbers of the second oil inlet chambers 501 and the second oil outlet chambers 502 can be reduced, and numbers of the second grooves 503 and the second bosses 504 can be reduced accordingly, which helps to simplify the structure of the second oil ring 50.

In an embodiment, a second oil injection hole 500 (see FIG. 1) is formed on an inner surface of the second oil ring 50, the second oil injection hole 500 is communicated with the second oil outlet chamber 502, and the second oil injection hole 500 directly faces the stator winding 22. In this way, the cooling oil flowing out of the second oil outlet chamber 502 may further cool the stator winding 22, without a need to separately arrange an oil channel for cooling the stator winding 22.

In the embodiment illustrated in FIG. 1, the first oil injection hole 400 directly faces the stator winding 22 at the first end 212, and the second oil injection hole 500 directly faces the stator winding 22 at the second end 213, so that the two stator windings 22 of the stator 20 can be cooled separately.

In this embodiment, the first oil ring 40 and the second oil ring 50 adopt an identical structure. The first oil ring 40 and the second oil ring 50 may be made from plastics with oil resistance and high-temperature resistance, including but not limited to, polyamide, high-temperature resistant nylon, and polyphenylene sulfide.

The stator core 21 and the stator winding 22 in the present disclosure are fully and evenly cooled, which effectively reduces a risk of high-temperature aging failure of insulation of the motor system and improves power density and torque density of the motor.

In the oil cooling motor according to the present disclosure, the cooling oil enters from the first oil ring 40, and enters the second oil ring 50 through the first oil cooling channel 210 of the stator core 21 and then is sprayed out, enabling internal cooling and end cooling of the stator core 21 to be at a same rate of flow. Similarly, the cooling oil enters from the second oil ring 50, and enters the first oil ring 40 through the second oil cooling channel 211 of the stator core 21 and then is sprayed out, enabling internal cooling and end cooling of the stator core 21 to be at a same rate of flow.

The present disclosure provides an improved motor stator and an improved oil cooling motor, which can improve a cooling effect and improve compactness of the motor stator.

The present disclosure provides a motor stator, including a stator core of a hollow columnar structure, the stator core including a first end and a second end in an axial direction, the stator core defining a first oil cooling channel and a second oil cooling channel through in the axial direction, the first oil cooling channel having a first oil inlet formed at the first end and a first oil outlet formed at the second end, the second oil cooling channel having a second oil outlet formed at the first end and a second oil inlet formed at the second end, and at the first end, the first oil inlet and the second oil outlet being arranged along a circumferential direction of the stator core and located on a same circumference centered around an axis of the stator core.

In some examples, the stator core includes a plurality of lamination stacks stacked along the axial direction, each of the lamination stacks defines a first oil through hole through in the axial direction, the first oil through holes are sequentially communicated to form the first oil cooling channel, and in at least two adjacent lamination stacks, a circulation area of the first oil through hole of the lamination stack closer to the first oil inlet is greater than a communication area where the two first oil through holes of the adjacent lamination stacks are communicated.

In some examples, in two adjacent lamination stacks, the first oil through hole of the lamination stack closer to the first oil inlet has a circulation area greater than a circulation area of the first oil through hole of the other lamination stack; or the first oil through holes of the two adjacent lamination stacks have equal circulation areas, and two adjacent first oil through holes are staggered in the circumferential direction and partially communicated.

In some examples, the stator core includes a plurality of lamination stacks stacked along the axial direction, each of the lamination stacks defines a second oil through hole through in the axial direction, the second oil through holes are sequentially communicated to form the second oil cooling channel, and in at least two adjacent lamination stacks, the second oil through hole of the lamination stack closer to the second oil inlet has a circulation area greater than a communication area where the two second oil through holes of the adjacent lamination stacks are communicated.

In some examples, the first oil inlet and the first oil outlet are opposite along the axial direction of the stator core, or staggered along the circumferential direction of the stator core; and/or the second oil inlet and the second oil outlet are opposite along the axial direction of the stator core, or staggered along the circumferential direction of the stator core; and/or at the second end, the second oil inlet and the first oil outlet are arranged along the circumferential direction of the stator core and located on a same circumference centered around the axis of the stator core.

In some examples, a plurality of first oil cooling channels are provided, and a plurality of second oil cooling channels are provided; at the first end, a plurality of first oil inlets are arranged along the circumferential direction of the stator core, a plurality of second oil outlets are arranged along the circumferential direction of the stator core, and the plurality of first oil inlets and the plurality of second oil outlets are interleaved; and/or at the second end, a plurality of second oil inlets are arranged along the circumferential direction of the stator core, a plurality of first oil outlets are arranged along the circumferential direction of the stator core, and the plurality of second oil inlets and the plurality of first oil outlets are interleaved.

In some examples, the motor stator further includes a first oil ring arranged at the first end of the stator core, the first oil ring is coaxial with the stator core, and the first oil ring defines a first oil inlet chamber communicated with the first oil inlet and a first oil outlet chamber communicated with the second oil outlet.

In some examples, an outer surface of the first oil ring is provided with a first groove and a first boss arranged in the circumferential direction and extending in the axial direction, the first groove forms the first oil inlet chamber, an end surface on a side of the first boss facing the stator core defines the first oil outlet chamber, and the first oil outlet chamber extends in the axial direction.

In some examples, an inner surface of the first oil ring defines a first oil injection hole, the first oil injection hole is communicated with the first oil outlet chamber, the stator includes a stator winding, and the first oil injection hole directly faces the stator winding.

In some examples, the motor stator further includes a second oil ring arranged at the second end of the stator core, the second oil ring is coaxial with the stator core, and the second oil ring includes a second oil inlet chamber communicated with the second oil inlet and a second oil outlet chamber communicated with the first oil outlet.

In some examples, an outer surface of the second oil ring is provided with a second groove and a second boss arranged in the circumferential direction and extending in the axial direction, the second groove forms the second oil inlet chamber, an end surface on a side of the second boss facing the stator core defines the second oil outlet chamber, and the second oil outlet chamber extends in the axial direction.

In some examples, an inner surface of the second oil ring defines a second oil injection hole, the second oil injection hole is communicated with the second oil outlet chamber, the stator includes a stator winding, and the second oil injection hole directly faces the stator winding.

The present disclosure further provides an oil cooling motor, including: a housing, the housing defining a housing oil inlet, a motor stator as described in any of the above items, the motor stator is arranged in the housing and includes a stator core, a first oil inlet and a second oil inlet of the stator core being communicated with the housing oil inlet.

The technical solution according to the present disclosure can achieve at least the following beneficial effects.

The present disclosure provides a motor stator and an oil cooling motor. A stator core defines a first oil cooling channel and a second oil cooling channel in opposite circulation directions, so that cooling oil can be transported respectively from two axial ends of the stator core to the stator core through the first oil cooling channel and the second oil cooling channel, and the stator core can be cooled through multiple oil channels in opposite circulation directions, which improves heat dissipation efficiency and achieves uniform heat dissipation. Moreover, the first oil inlet and the second oil outlet are arranged along a circumferential direction of the stator core and located on a same circumference centered around an axis of the stator core. This arrangement not only enables the stator core to be cooled at different parts in the circumferential direction, but also enables the first oil inlet and the second oil outlet to be more compact in a radial direction of the stator core, which is conducive to reducing a radial size of the stator core.

The above are merely preferred embodiments of the present disclosure, which are not intended to limit the present disclosure. Any modification, equivalent replacement, improvement and the like made within the spirit and principle of the present disclosure should be included in the protection scope of the present disclosure.

What is claimed is:

1. A stator for a motor, comprising:
   a stator core of a hollow columnar structure, the stator core comprising a first end and a second end in an axial direction, the stator core defining a first oil cooling channel and a second oil cooling channel, the first oil cooling channel and the second oil cooling channel being through in the axial direction, the first oil cooling channel having a first oil inlet at the first end and a first oil outlet at the second end, the second oil cooling channel having a second oil outlet at the first end and a second oil inlet at the second end, and at the first end, the first oil inlet and the second oil outlet being arranged along a circumferential direction of the stator core and located on a same circumference centered around an axis of the stator core; and
   a first oil ring arranged at the first end of the stator core, wherein the first oil ring is coaxial with the stator core, and the first oil ring comprises a first oil inlet chamber communicated with the first oil inlet and a first oil outlet chamber communicated with the second oil outlet.

2. The stator according to claim 1, wherein the stator core comprises a plurality of lamination stacks stacked along the axial direction, each of the lamination stacks defines a respective first oil through hole through in the axial direction, the first oil through holes are sequentially communicated to form the first oil cooling channel, and in at least one pair of adjacent lamination stacks of the plurality of lamination stacks, the first oil through hole of the lamination stack closer to the first oil inlet has a circulation area greater than a communication area where the two first oil through holes of the at least one pair of adjacent lamination stacks are communicated.

3. The stator according to claim 2, wherein in the at least one pair of adjacent lamination stacks, the first oil through hole of the lamination stack closer to the first oil inlet has a circulation area greater than a circulation area of the first oil through hole of the other lamination stack.

4. The stator according to claim 2, wherein the first oil through holes of the two adjacent lamination stacks have equal circulation areas, and two adjacent first oil through holes are staggered in the circumferential direction and partially communicated.

5. The stator according to claim 2, wherein each of the plurality lamination stacks defines a respective second oil through hole through in the axial direction, the second oil through holes are sequentially communicated to form the second oil cooling channel, and in at least two adjacent lamination stacks, the second oil through hole of the lamination stack closer to the second oil inlet has a circulation area greater than a communication area where the two second oil through holes of the adjacent lamination stacks are communicated.

6. The stator according to claim 1, wherein the first oil inlet and the first oil outlet are opposite along the axial direction of the stator core.

7. The stator according to claim 1, wherein the first oil inlet and the first oil outlet are staggered along the circumferential direction of the stator core.

8. The stator according to claim 1, wherein the second oil inlet and the second oil outlet are opposite along the axial direction of the stator core.

9. The stator according to claim 1, wherein the second oil inlet and the second oil outlet are staggered along the circumferential direction of the stator core.

10. The stator according to claim 1, wherein at the second end, the second oil inlet and the first oil outlet are arranged along the circumferential direction of the stator core and located on a same circumference centered around the axis of the stator core.

11. The stator according to claim 1, wherein a plurality of first oil cooling channels is provided, and a plurality of second oil cooling channels is provided; and
   at the first end, a plurality of first oil inlets is arranged along the circumferential direction of the stator core, a plurality of second oil outlets is arranged along the circumferential direction of the stator core, and the plurality of first oil inlets and the plurality of second oil outlets are interleaved.

12. The stator according to claim 1, wherein a plurality of first oil cooling channels is provided, and a plurality of second oil cooling channels is provided; and
   at the second end, a plurality of second oil inlets is arranged along the circumferential direction of the stator core, a plurality of first oil outlets are arranged along the circumferential direction of the stator core, and the plurality of second oil inlets and the plurality of first oil outlets are interleaved.

13. The stator according to claim 1, wherein an outer surface of the first oil ring comprises a first groove and a first boss arranged in the circumferential direction and extending in the axial direction, the first groove forms the first oil inlet chamber, an end surface of the first boss facing the stator core defines the first oil outlet chamber, and the first oil outlet chamber extends in the axial direction.

14. The stator according to claim 13, wherein an inner surface of the first oil ring defines a first oil injection hole, the first oil injection hole is communicated with the first oil outlet chamber, the stator comprises a stator winding, and the first oil injection hole directly faces the stator winding.

15. The stator according to claim 1, wherein the first oil ring comprises a plurality of first oil inlet chambers and a plurality of first oil outlet chambers, the plurality of first oil inlet chambers and the plurality of first oil outlet chambers are interleaved, and the plurality of first oil inlet chambers are communicated with each other at an end away from the stator core in the axial direction.

16. The stator according to claim 1, further comprising a second oil ring arranged at the second end of the stator core, wherein the second oil ring is coaxial with the stator core, and the second oil ring comprises a second oil inlet chamber communicated with the second oil inlet and a second oil outlet chamber communicated with the first oil outlet.

17. The stator according to claim 16, wherein an outer surface of the second oil ring comprises a second groove and a second boss arranged in the circumferential direction and extending in the axial direction, the second groove forms the second oil inlet chamber, an end surface of the second boss facing the stator core defines the second oil outlet chamber, and the second oil outlet chamber extends in the axial direction.

18. The stator according to claim 17, wherein an inner surface of the second oil ring defines a second oil injection hole, the second oil injection hole is communicated with the second oil outlet chamber, the stator comprises a stator winding, and the second oil injection hole directly faces the stator winding.

19. An oil cooling motor, comprising:
   a housing defining a housing oil inlet;
   a stator comprising:
      a stator core of a hollow columnar structure, the stator core comprising a first end and a second end in an axial direction, the stator core defining a first oil cooling channel and a second oil cooling channel, the first oil cooling channel and the second oil cooling channel being through in the axial direction, the first oil cooling channel having a first oil inlet at the first end and a first oil outlet at the second end, the second oil cooling channel having a second oil outlet at the first end and a second oil inlet at the second end, and at the first end, the first oil inlet and the second oil outlet being arranged along a circumferential direction of the stator core and located on a same circumference centered around an axis of the stator core; and
      a first oil ring arranged at the first end of the stator core, wherein the first oil ring is coaxial with the stator core, and the first oil ring comprises a first oil inlet chamber communicated with the first oil inlet and a first oil outlet chamber communicated with the second oil outlet;
   wherein the stator is arranged in the housing, and the first oil inlet and the second oil inlet of the stator core are communicated with the housing oil inlet.

* * * * *